(12) United States Patent
Hernández Hernández

(10) Patent No.: US 9,032,574 B2
(45) Date of Patent: May 19, 2015

(54) FOOTWEAR PRODUCTION METHOD

(75) Inventor: Adrián Hernández Hernández, Monforte del Cid (ES)

(73) Assignee: Simplicity Works Europe, S.L., Alicante (ES)

( * ) Notice: Subject to any disclaimer, the term of this patent is extended or adjusted under 35 U.S.C. 154(b) by 833 days.

(21) Appl. No.: 13/260,500

(22) PCT Filed: Mar. 18, 2010

(86) PCT No.: PCT/ES2010/000108
§ 371 (c)(1),
(2), (4) Date: Dec. 28, 2011

(87) PCT Pub. No.: WO2010/109032
PCT Pub. Date: Sep. 30, 2010

(65) Prior Publication Data
US 2012/0090103 A1    Apr. 19, 2012

(30) Foreign Application Priority Data

Mar. 26, 2009    (ES) .................................. 200900830

(51) Int. Cl.
| A43B 23/00 | (2006.01) |
| B29D 35/12 | (2010.01) |
| B29D 35/14 | (2010.01) |
| B29D 35/00 | (2010.01) |

(Continued)

(52) U.S. Cl.
CPC ............ *B29D 35/126* (2013.01); *B29D 35/122* (2013.01); *B29D 35/146* (2013.01); *A43B 23/0255* (2013.01); *A43B 23/0295* (2013.01);

*A43B 23/0215* (2013.01); *B29D 35/0009* (2013.01); *B29D 35/128* (2013.01); *B29L 2031/505* (2013.01); *B29C 45/14508* (2013.01)

(58) Field of Classification Search
CPC .. B29D 35/126; B29D 35/122; B29D 35/146; A43B 23/0255; A43B 23/0295
USPC .............. 12/145, 142 T, 146 C; 36/49, 47, 48
See application file for complete search history.

(56) References Cited

U.S. PATENT DOCUMENTS 3,535,418 A  * 10/1970  Daum Helmut et al. ..... 264/244
3,552,039 A     1/1971  Fukuoka
(Continued)

FOREIGN PATENT DOCUMENTS

ES      8101866     4/1981
ES       286857    11/1985
(Continued)

OTHER PUBLICATIONS

International Search Report for International Application No. PCT/ES2010/000108 dated Jul. 14, 2010.

*Primary Examiner* — Ted Kavanaugh
(74) *Attorney, Agent, or Firm* — Merchant & Gould P.C.

(57) ABSTRACT

A method of manufacturing footwear by a mold (1 and 2) and a counter-mold is in the form of a last (3), between which the pieces (4 and 5) that will form the upper are arranged. These pieces define channels (9) between one another which, together with cavities (10 and 11) demarcated between mold and counter-mold, determine a network of channels and cavities into which a thermoplastic material in molten state is injected.

1 Claim, 3 Drawing Sheets

(51) Int. Cl.
  *B29C 45/14* (2006.01)
  *A43B 23/02* (2006.01)
  *B29L 31/50* (2006.01)

(56) References Cited

U.S. PATENT DOCUMENTS

| | | | |
|---|---|---|---|
| 3,698,108 A | | 10/1972 | Brunner |
| 4,150,455 A | * | 4/1979 | Fukuoka .................. 12/142 RS |
| 4,295,238 A | | 10/1981 | Clark |
| 5,667,815 A | * | 9/1997 | Herber et al. .................. 425/119 |
| 5,885,500 A | * | 3/1999 | Tawney et al. ................. 264/154 |
| 2003/0233771 A1 | | 12/2003 | Soon et al. |
| 2006/0017195 A1 | * | 1/2006 | Yang ............................ 264/244 |
| 2008/0250668 A1 | * | 10/2008 | Marvin et al. ..................... 36/54 |
| 2014/0189964 A1 | * | 7/2014 | Wen et al. ................... 12/142 R |

FOREIGN PATENT DOCUMENTS

| | | |
|---|---|---|
| ES | 2 027 609 | 6/1992 |
| ES | 2 099 677 | 5/1997 |

* cited by examiner

FOOTWEAR PRODUCTION METHOD

This application is a National Stage Application of PCT/ES2010/000108, filed 18 Mar. 2010, which claims benefit of Serial No. P2009000830, filed 26 Mar. 2009 in Spain and which applications are incorporated herein by reference. To the extent appropriate, a claim of priority is made to each of the above disclosed applications.

FIELD OF THE INVENTION

The present invention relates to a method of manufacturing footwear made up of an injected underpart and an upper formed by pieces made of natural or synthetic leather, elastic, adornments, etc.

More specifically, the method of the invention is envisaged for the manufacture of footwear of the described type in which the upper, formed by more than one piece, lacks seams.

BACKGROUND OF THE INVENTION

The manufacture of footwear by traditional methods comprises the following operations:
 Cutting pieces of upper which will form the top part of the footwear.
 Manually joining these pieces to one another by means of glues, seams, including reinforcements and decorative elements, etc.
 In addition, a process is performed, which is the manufacture of the midsole, which requires the upper and the forming thereof on the inner surface of the last.
 Preparation processes are then performed for the assembly, such as the placement of reinforcements in the back and front part that will form the counter and tips.
 Fixing the insole on the inner surface of the last with staples or tape.
 Assembling the different components, for which different alternatives are possible, the most common being machine assembly, where the upper is placed on the last, with the midsole thereunder.
 Introducing the assembled set into a forming oven so that the materials stabilize and conserve the shape.
 Scouring the grain side of the upper with the shape of the sole previously marked thereon.
 Applying glue to the scoured part and also to the sole, chemically prepared previously for the anchoring of the glue.
 Separately manufacturing, generally through auxiliary companies, the sole made up in most cases of injection materials.
 Gluing the sole by means of a correct positioning and application of pressure to the machine.
 Removing the finished footwear from the last for subsequent cleaning and application of some type of final finish.

The described process involves a large number of operations and requires a considerable amount of manual labor, making the manufacture of the footwear much more expensive.

DESCRIPTION OF THE INVENTION

The object of the present invention is a method of manufacturing footwear by means of a reduced number of operations in comparison with traditional processes, thereby allowing the reduction of manufacturing costs.

Another object of the invention is to obtain footwear with a different and more attractive appearance than that of footwear obtained by traditional methods.

The manufacture of footwear with the method of the invention is carried out by means of the following steps:
 a) Cutting the pieces that will form the upper of the footwear.
 b) Preparing a mold and counter-mold, which mold is made up of two or more parts which internally reproduce the outer configuration of the footwear in its entirety, upper and underpart, and have areas the contour of which corresponds to that of the pieces that will form the upper of the footwear. The counter-mold adopts the shape of a metal last and demarcates with the inner surface of the mold cavities that will correspond to the volume of the upper and underpart.
 c) Placing the pieces that will form the upper of the footwear in the areas defined inside the mold, from which they will project to demarcate empty cavities and channels.
 d) Injecting a thermoplastic material in molten state into the mold until filling all the cavities and channels demarcated by the pieces that will form the upper and coming into contact with said pieces.
 e) Opening the mold and extracting the last constituting the counter-mold, thus providing the finished footwear.

The method of the invention with the described steps allows eliminating virtually all the operations of the traditional methods, thereby allowing greatly reducing the manual labor cost.

In the method of the invention the inner surface of the parts forming the mold reproduces the total volume of the footwear, including the upper and the underpart. The areas reproducing the upper have a topography comprising areas separated by ribs of little height, in which areas the pieces of the upper, of greater thickness than the ribs, are placed, said pieces demarcating a network of channels and cavities, including the volume corresponding to the underpart which, when injecting the thermoplastic material in molten state, configures a skeleton that is in contact with the pieces of the upper in order to serve as a joining means between them while at the same time forming the underpart or sole of the footwear with which the aforementioned skeleton is connected.

The areas intended for receiving the pieces that will form the upper, demarcated by the aforementioned ribs, will have fixing means for fixing said pieces in order to assure their positioning during the injection of the thermoplastic material. These fixing means can consist of an adhesive coating with reduced fixing capacity which will cover at least part of the surface of the aforementioned areas. The aforementioned fixing means can also consist of small pointed projections, like small needles, projecting from the surface of the aforementioned areas and the height of which will be smaller than the thickness of the pieces which will form the upper of the footwear.

The pieces that will form the upper are placed in an inverted position when the mold is open. Once all the components of the upper are placed, the different parts forming the mold are coupled on the metal last which acts like a counter-mold, the mold set being closed in order to inject the thermoplastic material in molten state. Then, once the injected material is cured, the mold is opened, the last is removed from the footwear and finished footwear with formed upper and sole is provided, with the general appearance of traditional footwear but with its own special character because it will be lacking seams, thereby giving the top visible surface of the footwear a different appearance.

As can be understood, any other component can be applied on the footwear obtained by the method of the invention by means of sewing, riveting, etc.

In the method of the invention, a coating of a suitable material can be applied on the surface of the last prior to injection, for example based on a leather or fabric liner which would be in contact with the grain side toward the last and the flesh side toward the fluid. Footwear with an upper and a liner would thus be obtained, and the ribs of the thermoplastic material would also remain concealed between liner and upper. In other words, when looking at the inside of the footwear, only the liner would be seen rather than the flesh side of the leather of the upper and the ribs of thermoplastic materials joining the pieces of said upper to one another. Seams can be used in this liner for its formation.

BRIEF DESCRIPTION OF THE DRAWINGS

The method of manufacture of the invention is depicted in the attached drawings given by way of non-limiting example, in which.

DETAILED DESCRIPTION OF AN EMBODIMENT

Figure 1:
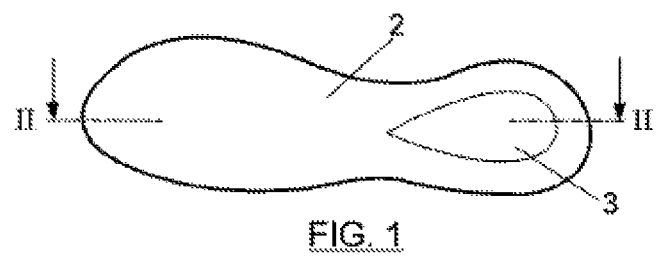
FIG. 1 is a plan view of a mold used for manufacturing footwear according to the invention.
Figure 2:
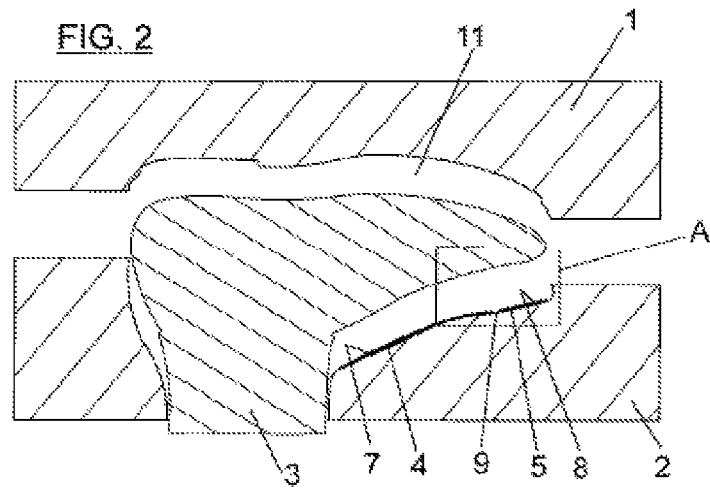
FIG. 2 is a longitudinal section of the mold and last which acts like a counter-mold, taken along section line II-II of FIG. 1.
Figure 3:
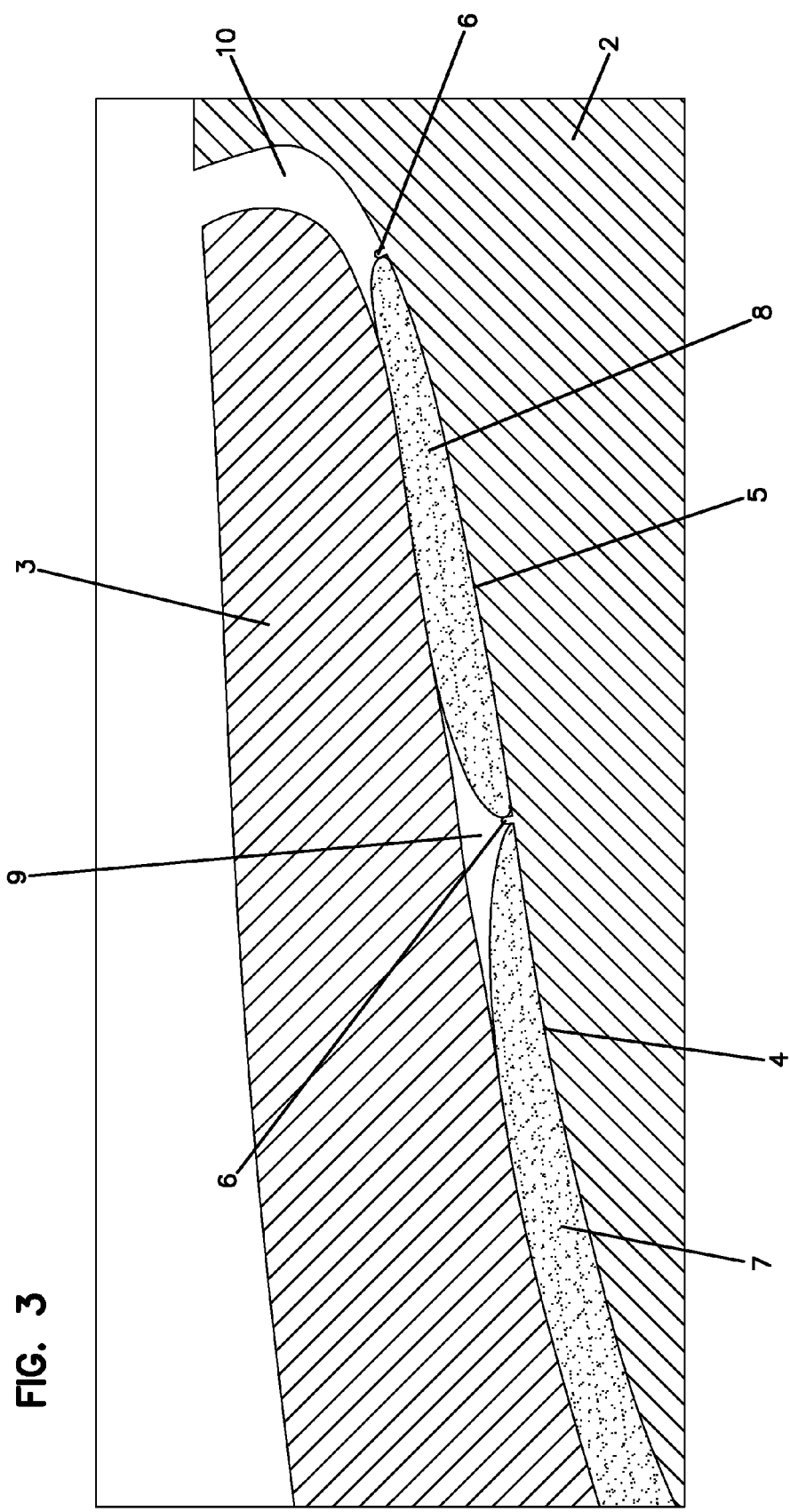
FIG. 3 corresponds to detail A of FIG. 2 on a larger scale.

The manufacture of footwear by means of the method of the invention is performed with a mold and counter-mold depicted in FIGS. 1 to 3.

The mold will reproduce the outer surface of the footwear to be manufactured, including the underpart, and will be made up of at least two parts 1 and 2 which, when closed, will demarcate a cavity that will correspond to the outer configuration of the footwear. This mold can be made up of a greater number of parts which can be coupled to one another.

A metal last 3 which acts like a counter-mold is housed inside the mold formed by parts 1 and 2, such that between the outer surface of the last and the inner surface of the parts 1 and 2 forming the mold there is demarcated a space which will correspond to that of the footwear, including the upper and underpart.

In the example depicted in the drawings, part 1 of the mold is what will demarcate, together with the last 3, the cavity for the sole of the footwear, where as the space demarcated between part 2 and the last 3 corresponds to the volume of the upper.

According to the invention, part 2 has on its inner surface areas 4, the contour of which corresponds to that of the pieces that will form the upper of the footwear, areas which are separated and demarcated by ribs 6, FIG. 3.

There are arranged in all the areas of the inner surface of part 2 of the mold, corresponding to pieces of the upper and generally indicated in FIGS. 2 and 3 with reference numbers 4 and 5, the corresponding previously cut pieces of the upper, indicated with reference numbers 7 and 8, these pieces being of a thickness greater than the height of the ribs 6, such that between consecutive pieces 7 and 8 channels 9 are demarcated which will be closed by the last 3 when the mold is closed thereon. At the same time, cavities 10, which will correspond to the peripheral areas of the footwear or underpart, are demarcated between the last 3 and part 2. Finally, a cavity 11, which will correspond to the volume of the underpart of the footwear, will be demarcated between the last 3 and part 1.

Figure 4:
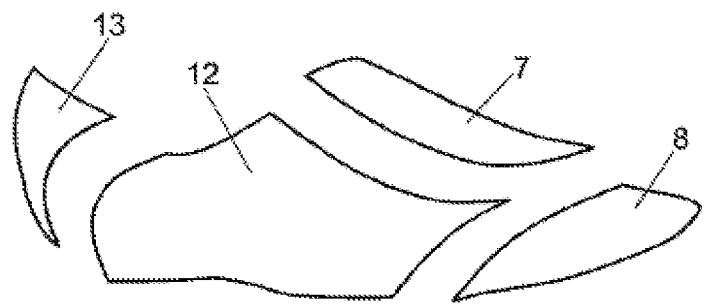
FIG. 4 shows a side elevational view of the position of the different pieces forming part of the upper of the footwear.

By way of example, FIG. 4 depicts the relative position that the different pieces 7, 8, 12 and 13 that will form the upper of footwear, separated from one another by the channels 9, will adopt.

The pieces forming the upper can be of natural or synthetic leather, can include elastic, decorations, etc., in each case being placed in areas or cavities formed in the inner surface of part 2 of the mold.

Figure 5:
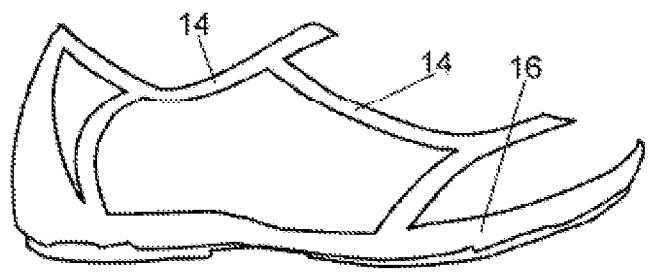
FIG. 5 depicts the network of ribs and underpart obtained when injecting the thermoplastic material into the matching last and counter-last set of FIG. 2.

Once all the pieces of the upper are placed and the mold is closed with the last inside it, a thermoplastic material in molten state is injected, there being produced, through the network of channels 9 and cavities 10 and 11 demarcated between mold and last, a skeleton such as the one depicted in FIG. 5, between the ribs of which the pieces 7, 9, 12 and 13 depicted in FIG. 4 will be located. The skeleton of FIG. 5, together with the underpart obtained in the same injection operation, without pieces 7, 9, 12 and 13, could configure a sandal or similar footwear.

Due to the shape of the channels 9 together with the cavities 10 and 11, and since the ribs 6 do not reach the surface of the last 3, the molten thermoplastic material which is injected into the closed mold is in contact with the pieces 4 and 5 that will form the upper, serving as a means for joining the same.

Figure 6:
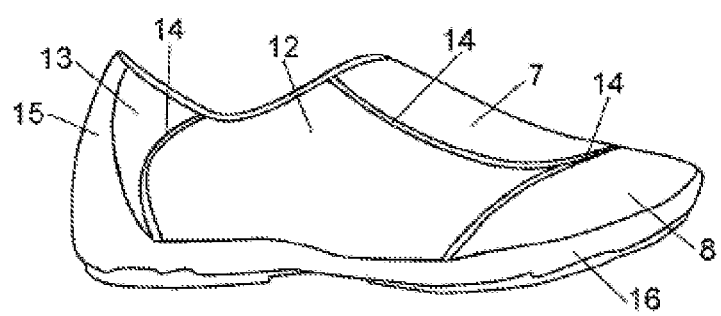
FIG. 6 shows a side elevational view of footwear obtained with the method of the invention.

When opening the mold and extracting the last 3 footwear such as that depicted in FIG. 6 is obtained, in which the pieces 7, 8, 12, 13, etc., forming the upper are attached to one another by the intermediate ribs 14 and, in the depicted example, by the area 15 of counter and sole 16, made from the injected thermoplastic material.

The footwear of FIG. 6, as it is obtained when opening the mold, will be ready for coupling the insole thereto and for cleaning products without requiring sole stitching, assembly, forming and gluing operations which are necessary in traditional methods.

As mentioned above, a coating which will be fixed to the inner surface of the pieces forming the upper, acting like a footwear liner, can be applied on the surface of the last 3.

The invention claimed is:

1. A method of manufacturing footwear, comprising an upper made up of independent pieces, the method comprising the steps of:
   a) cutting pieces that will form the upper of the footwear;
   b) preparing a mold and counter-mold, between which is demarcated a space corresponding to a volume of the upper and an underpart, the mold is made up of two or more parts which internally reproduce an outer configuration of the footwear and have areas having a contour corresponding to a contour of the pieces that will form the upper of the footwear, and the counter-mold of which adopts the shape of a metal last and demarcates with an inner surface of the pieces forming the mold a volume corresponding to a volume of the upper and underpart of the footwear;
   c) placing the pieces that will form the upper of the footwear in the areas defined inside the mold, from which the pieces project to demarcate empty cavities and channels;
   d) injecting a thermoplastic material in molten state into the mold until filling all the cavities formed between the mold and the counter-mold and the channels demarcated by the pieces that will form the upper and coming into contact with said pieces;
e) opening the mold and extracting the last of the counter-mold;
wherein the areas are demarcated by ribs of a height less than the thickness of the pieces that will from the upper, the ribs being separated from the surface of the last when the mold is closed;
wherein the pieces that will form the upper have edges sheared at a flesh side; and
wherein the channels delimited between opposing edges of consecutive pieces are shallower that thicknesses of the pieces that will form the upper, and the channels widen to coincide with sheared edges of the pieces.

* * * * *